(No Model.)

J. O. BENEKE.
COMBINED DUST PAN AND ASH SIFTER.

No. 337,550. Patented Mar. 9, 1886.

WITNESSES:
C. Neveux
C. Sedgwick

INVENTOR:
J. O. Beneke
BY Munn & Co
ATTORNEYS.

UNITED STATES PATENT OFFICE.

JOHN O. BENEKE, OF NEW ORLEANS, LOUISIANA.

COMBINED DUST-PAN AND ASH-SIFTER.

SPECIFICATION forming part of Letters Patent No. 337,550, dated March 9, 1886.

Application filed September 10, 1885. Serial No. 176,733. (No model.)

*To all whom it may concern:*

Be it known that I, JOHN O. BENEKE, of New Orleans, in the parish of Orleans and State of Louisiana, have invented a new and Improved Combined Dust-Pan and Ash-Sifter, of which the following is a full, clear, and exact description.

This invention consists in a shovel-like implement for domestic use, which is readily convertible either into a dust-pan or sieve and ash-sifter, as required, substantially as hereinafter described, and pointed out in the claims.

Reference is to be had to the accompanying drawings, forming part of this specification, in which similar letters of reference indicate corresponding parts in all the figures.

Figure 1:
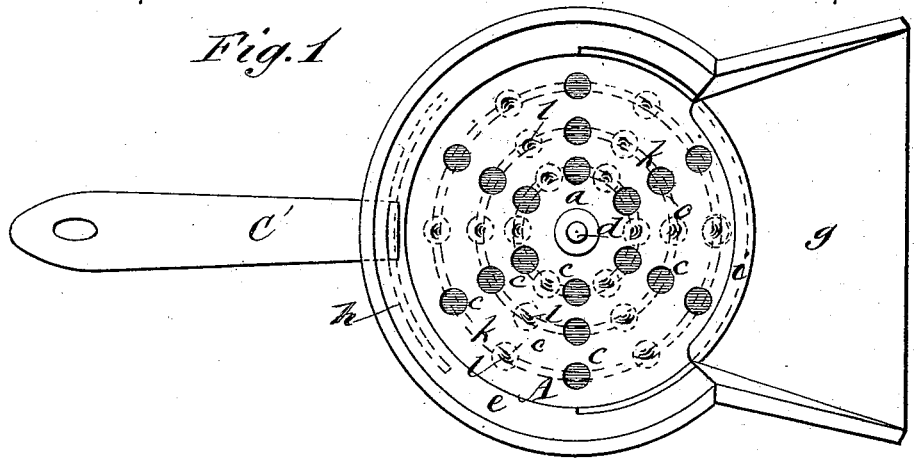
Figure 2:
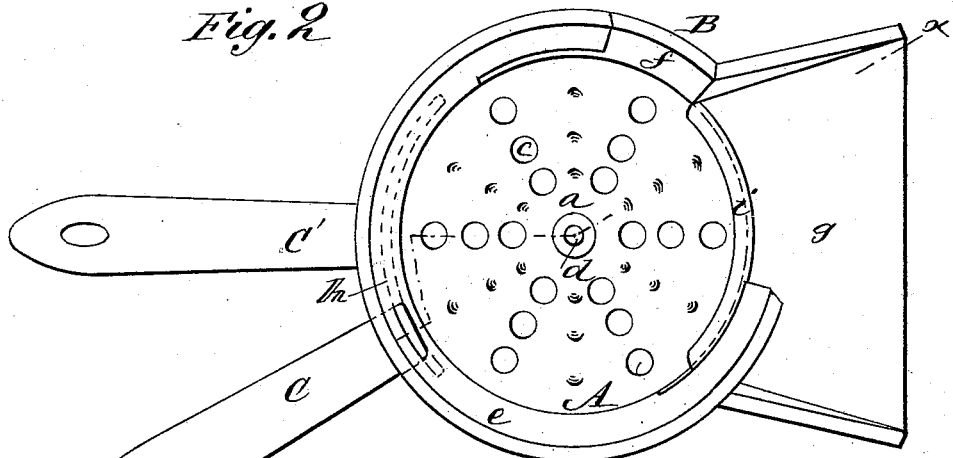
Figure 3:
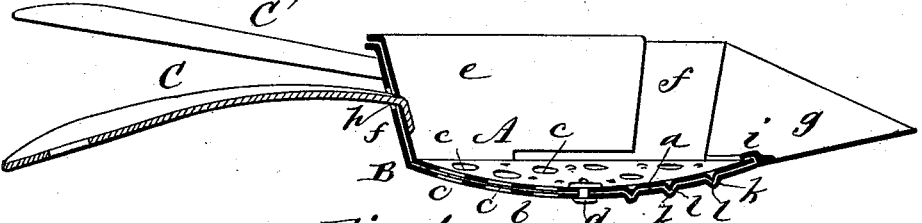

Figure 1 represents a top view of the implement with its parts adjusted for using it as a dust-pan; Fig. 2, a similar view of the same when adjusted to operate as a sieve or ash-sifter; Fig. 3, a longitudinal section upon the irregular line $x\ x$ in Fig. 2, and Fig. 4 a rear view of the implement with its parts adjusted as in Fig. 1.

The implement consists, mainly, of upper and lower pans or sections, A B, made of tin, iron, or other metal or alloy, arranged one within or over the bottom of the other and provided, respectively, with handles C C'. Both sections or "pans," as they will here be termed, A B, have their bottoms $a\ b$ of circular plate form with a series of perforations, $c\ c$, of any desired pattern, in or through them, but arranged so that the perforations in the upper pan, A, may be brought in line with or over the perforations in the lower pan, B, by turning or adjusting the upper pan into a suitable position about a central axis—as, for instance, about or around a central pin or rivet, $d$—uniting the bottoms of the two pans together. This open position of the perforations in the two pans relatively to each other is only assumed when the handles C C' are out of line with one another—as, for instance, in Fig. 2. When the pans are adjusted or turned about the pivot or rivet $d$, so as to bring the handles C C' in line with one another—that is, the one handle directly under the other, as in Figs. 1 and 4—then the perforations $c\ c$ in the two parts will occupy a closed position, or be out of line with one another. In effect the upper pan, A, is a circularly vibrating or oscillating perforated slide arranged on the perforated bottom of the lower pan, B; but it assumes the form of a pan by being provided with a partly-circular upturned flange or marginal portion, $e$, open in front and arranged to fit within and against the upturned partly-circular flange or sides and back $f$ of the lower pan, which latter terminates in front in a mouth-piece, $g$, to receive dust, ashes, or cinders. The handle C of the upper pan, A, passes through a slot, $h$, in the back of the upturned flange $f$ of the lower pan, to provide for shaking or vibrating the upper pan, or for adjusting its perforations $c$ in line with the perforations $c$ in the lower pan by means of the handle C, and the upturned flange $e$ of the upper pan, which need not be of any greater depth than is sufficient to cover the slot $h$, mainly serves to prevent ashes, cinders, and dust from passing out through said opening or slot and to check the passage of dust or ashes between the bottoms of the two pans. The bottom $b$ of the lower pan is also provided with a front lip, $i$, on its upper surface, adapted to receive the front marginal portion of the bottom $a$ of the upper pan within it, alike for the purpose of holding the upper pan down to its place and to prevent ashes, cinders, or dust from entering between the bottoms of the pans.

As it is very desirable, in order to secure a free and easy working of the upper pan when shaking or adjusting it on or over the lower pan, that any dust and ashes which may pass in between the bottoms of the pans should not collect or be left there, the bottom of the lower pan is made with a series of annular corrugations or gutters, $k$, in its upper surface, in line with the perforations $c$ in the bottom $b$ of said pan, and the upper pan, A, has a series of projections or scrapers, $l$, on its under side, between the perforations $c$ in it, and arranged to travel within the gutters $k$, when vibrating or turning the upper pan on its axis, to clear out or remove dust or ashes that, entering between the bottoms of the two pans, work into the gutters $k$, and which the scrapers $l$ force out through the perforations $c$ in the bottom of the lower pan. These projections or scrapers $l$ may be made by simply indenting the upper surface of the bottom $a$ of the upper pan or slide, A.

Figure 4:
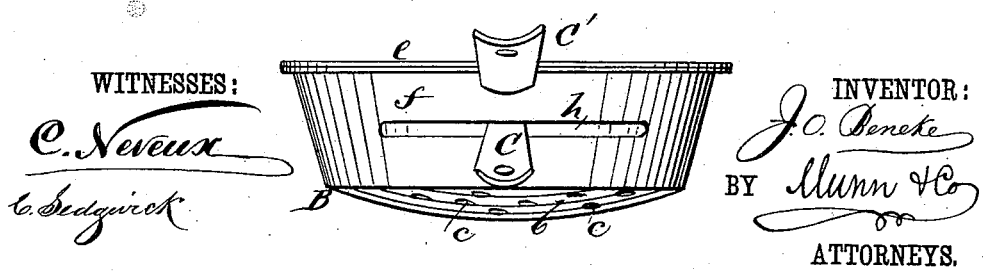

When the parts are in the position represented in Figs. 1 and 4—that is, with the perforations $c\ c$ in the bottoms of the two pans A B closed and the handles C C' in line with one another, so as to be both grasped by the same hand—then the implement may be used as a dust-pan or hand-shovel to collect the ashes and cinders from a fire-place, range, or stove, and afterward the upper pan, A, may be shaken by its handle C to sift the dust and ashes from the cinders, as the perforations $c$ in the bottom of the upper pan come over the perforations $c$ in the bottom of the lower pan; or, when the perforations $c\ c$ in the two pans are adjusted into line with each other, the implement may be simply shaken, as a sieve, by the handle C' of the lower pan, and the implement may thus be used as a dust pan or shovel and sieve for various purposes, a cover, if desired, being used over it to prevent the dust or fine particles from rising.

Having thus described my invention, I claim as new and desire to secure by Letters Patent—

1. The combination, with the lower pan, B, having perforations $c$ in its bottom, a handle, C', a mouth-piece, $g$, and back and sides $f$, provided with a rear opening or slot, $h$, of the upper pan, A, pivoted to turn upon or within the lower pan, and having a handle, C, arranged to pass out through said opening, and having perforations $c$, arranged to come into and out of line with the perforations in the lower pan as the handles C C' are brought into or out of line with one another, essentially as described.

2. The upper perforated pan, A, provided with an upturned flange, $e$, open in front, and handle C, in combination with the lower perforated pan, B, with its back and sides $f$, having an opening or slot, $h$, the mouth $g$, handle C', and pivot $d$, substantially as specified.

3. The lower perforated pan, B, provided with annular gutters $k$, connecting its perforations, in combination with the shaking or vibrating upper perforated pan, A, having projections or scrapers $l$, arranged to work within said gutters, substantially as specified.

JOHN O. BENEKE.

Witnesses:
A. GREGORY,
C. SEDGWICK.